UNITED STATES PATENT OFFICE.

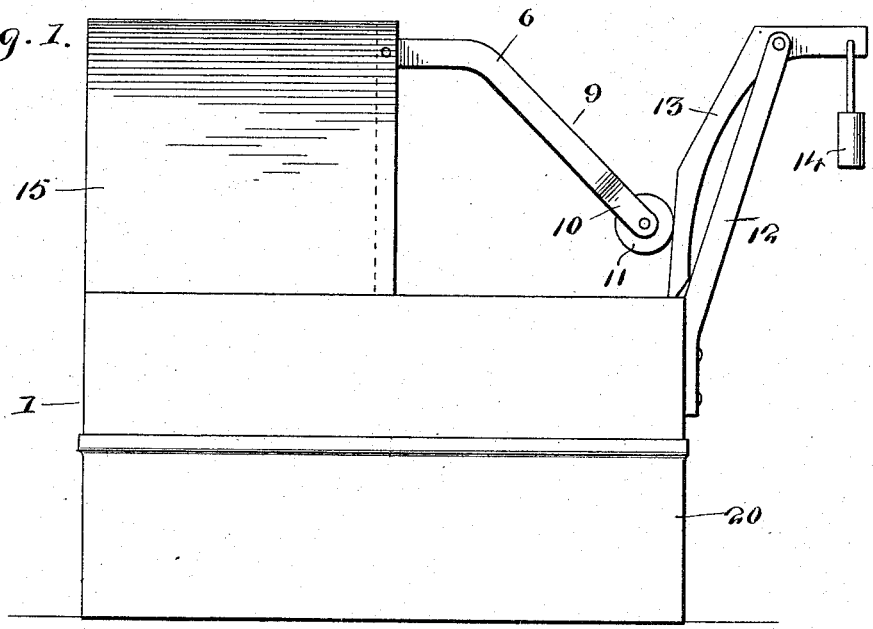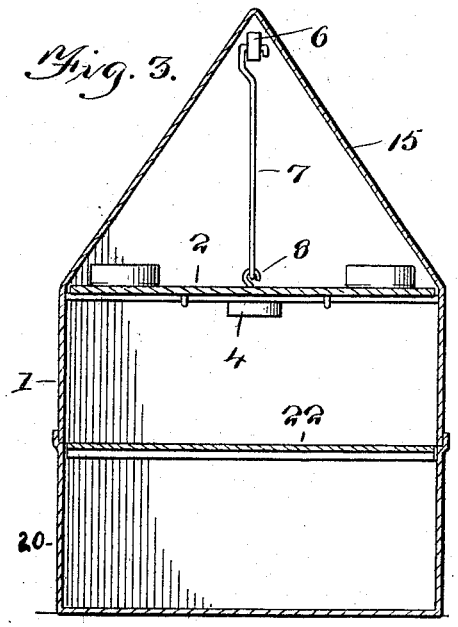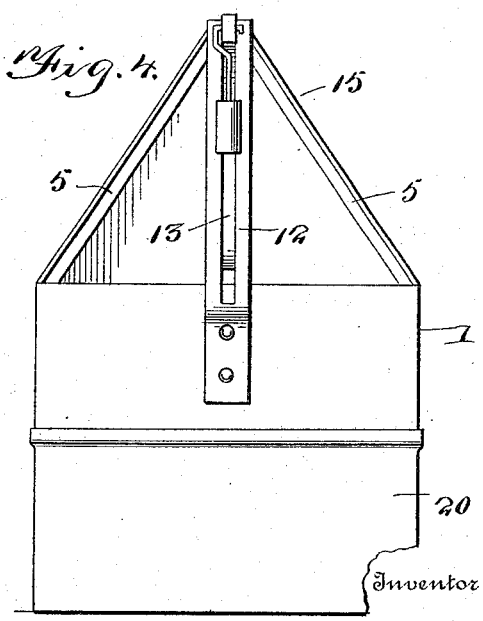

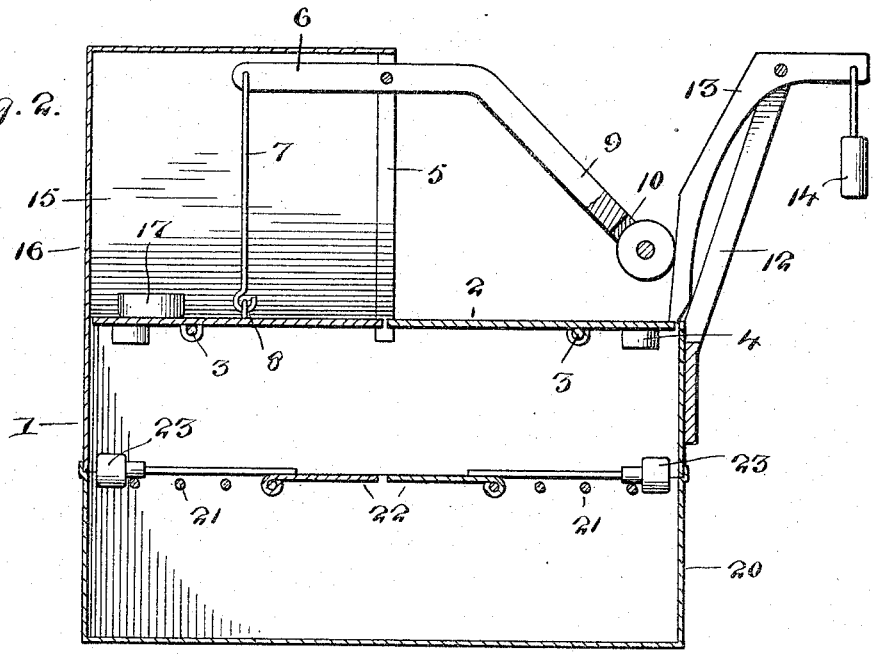
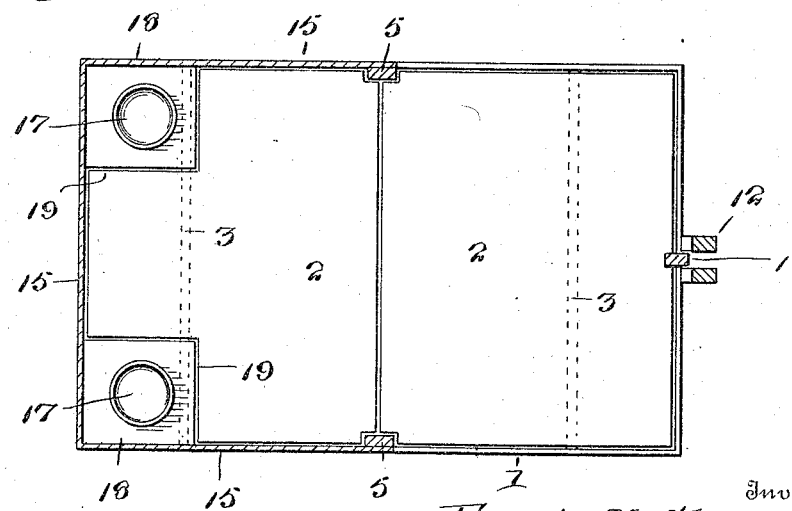

FRANCIS M. CLOUD, OF NEW PALESTINE, INDIANA.

RAT-TRAP.

1,192,275.   Specification of Letters Patent.   Patented July 25, 1916.

Application filed April 15, 1916. Serial No. 91,352.

*To all whom it may concern:*

Be it known that I, FRANCIS M. CLOUD, a citizen of the United States, residing at New Palestine, in the county of Hancock and State of Indiana, have invented new and useful Improvements in Rat - Traps, of which the following is a specification.

This invention relates to improvements in rat traps and has particular application to a self-setting trap.

In carrying out the present invention, it is my purpose to provide a self-setting trap which will open automatically under the weight of the rodent and discharge the rodent into a receptacle and which will be automatically reset when relieved of the weight of the rodent, thereby placing the trap in condition to trap another rat or the like.

It is also my purpose to provide a self-setting rat trap which will embrace the desired features of simplicity, efficiency and durability, which will operate effectively under all conditions, and which will embody comparatively few parts and these so arranged and correlated as to reduce the possibility of derangement to a minimum.

With the above and other objects in view, the invention consists in the construction, combination and arrangement of parts hereinafter set forth in and falling within the scope of the claim.

In the accompanying drawings; Figure 1 is a view in side elevation of a rat trap constructed in accordance with the present invention. Fig. 2 is a longitudinal sectional view therethrough. Fig. 3 is a cross sectional view through the same. Fig. 4 is an end view thereof. Fig. 5 is a horizontal sectional view through the trap, parts being shown in top plan.

Referring now to the drawings in detail, 1 designates a substantially rectangular frame and closing the upper end of the frame 1 are trap doors 2 placed end to end and having the outer ends thereof pivotally mounted upon rods 3 or the like carried by the side bars of the frame 1 and arranged adjacent to the respective end bars of such frame and parallel with such end bars. Connected to the outer ends of the trap doors 2 are weighted arms 4 that act to hold the doors normally in closed or horizontal position, as clearly illustrated in Fig. 2 of the drawings. Upstanding from the side bars of the frame 1 at a point approximately centrally of the frame are standards 5 converging toward each other at the upper ends thereof and pivoted between the upper ends of the standards 5 is a lever 6. This lever 6 extends from the doors 2 and one end thereof is connected through the medium of a link 7 with an eye bolt 8 carried by one of the doors, while the other end of the lever is provided with a downwardly projecting arm 9 having the lower end formed with a yoke 10 in which is journaled a roller 11. Connected to the end bar of the frame 1 adjacent to the yoke end of the arm 9 and upstanding from such end bar are uprights 12 and pivoted between the upper ends of the uprights 12 is one end of a lever 13, the other end of the lever projecting downwardly to engage the adjacent edge of the proximate door 2. The upper end of the pivot lever 13 is preferably projected outwardly and equipped with a depending weight 14. Covering the trap door connected to the lever 6 is an inverted V-shaped cover 15 and the end of the cover 15 at the outer end of the frame is closed by means of a wall 16.

Arranged adjacent to the wall 16 are bait holders 17. In the present instance, these bait holders are mounted upon plates 18 respectively secured to the end wall of the frame 1 adjacent to the wall 16 and these plates are arranged in rabbets 19 formed in the adjacent trap door 2.

Arranged beneath the frame 1 and adapted to support the latter and capable of removal from beneath the frame is a receptacle 20 having the upper end thereof closed by cross bars 21 and trap doors 22 arranged centrally of the upper end of the receptacle 20 and placed end to end and normally held in horizontal or closed position by means of weighted arms 23 connected to the doors 22 respectively.

In practice, the frame is placed over the receptacle 20 and rests thereon and the trap doors 22 and 2 are held in closed position by means of the weighted arms connected to such doors. When the rodent approaches the bait holders 17, such rodent traverses the trap doors 2 and when the rodent steps on the trap door beneath the cover 15, such door moves downwardly, thereby swinging the lever 6 to elevate the yoke end of such lever and in the upward movement of the yoke end of the lever, the roller 11 swings the lever 13 outwardly against the action of the weight 14 to release the other trap door, thereby permitting both doors to be swung downwardly under the weight of the rodent against the action of the weights connected to such doors. In the downward movement of the rodent, the trap doors controlling the receptacle 20 may be opened by the weight of the animal and the latter discharged into the receptacle. As soon as the trap doors 2 are relieved of the weight of the animal the weights connected thereto restore such doors to normal position, thereby returning the lever 6 to normal position, while the weight connected to the lever 13 restores the latter to its original position, thereby locking the doors in closed position.

I claim:

In a self-setting rat trap, a frame, trap doors within said frame arranged end to end and having the outer ends pivotally connected to the frame, means holding said doors normally in closed position, standards uprising from said frame, a lever pivoted between its ends between said standards, a connection between one end of said lever and one of said trap doors whereby the lever will be swung in the downward movement of said trap doors under the weight of a rodent, a weighted lever fulcrumed above the remaining door and engaging the same to hold such door normally against downward movement, and a roller carried by said first lever and adapted to swing said weighted lever in the movement of the first-mentioned lever to release the door held by the second-named lever.

In testimony whereof I affix my signature.

FRANCIS M. $\overset{\text{his}}{\times}$ CLOUD.
$\phantom{FRANCIS M. \times}{\text{mark}}$ Witnesses to signature:
 AMOS EVERSON,
 JOSEPH KITLEY.

Copies of this patent may be obtained for five cents each, by addressing the "Commissioner of Patents, Washington, D. C."